(12) United States Patent
Ueberschlag et al.

(10) Patent No.: US 8,547,000 B2
(45) Date of Patent: Oct. 1, 2013

(54) ULTRASONIC, FLOW MEASURING DEVICE

(75) Inventors: Pierre Ueberschlag, Saint-Louis (FR); Michal Bezdek, Aesch (CH); Andreas Berger, Hasel-Glashutten (DE)

(73) Assignee: Endress + Hauser Flowtec AG, Reinach (CH)

( * ) Notice: Subject to any disclaimer, the term of this patent is extended or adjusted under 35 U.S.C. 154(b) by 100 days.

(21) Appl. No.: 13/329,501

(22) Filed: Dec. 19, 2011

(65) Prior Publication Data

US 2012/0153777 A1 Jun. 21, 2012

(30) Foreign Application Priority Data

Dec. 20, 2010 (DE) .......................... 10 2010 063 538

(51) Int. Cl.
*H01L 41/08* (2006.01)
(52) U.S. Cl.
USPC ............................. 310/336; 310/334; 310/346
(58) Field of Classification Search
USPC .......................................... 310/334–336, 346
See application file for complete search history.

(56) References Cited

U.S. PATENT DOCUMENTS

| | | | | |
|---|---|---|---|---|
| 3,146,360 | A * | 8/1964 | Marshall | 310/326 |
| 3,461,327 | A * | 8/1969 | Zeiringer | 310/338 |
| 3,745,829 | A * | 7/1973 | Franchi | 73/290 V |
| 3,890,423 | A | 6/1975 | Zacharias, Jr. | |
| 4,162,111 | A * | 7/1979 | Brown | 310/326 |
| 4,742,717 | A | 5/1988 | Ichino | |
| 5,176,140 | A * | 1/1993 | Kami et al. | 600/459 |
| 5,280,724 | A * | 1/1994 | Higo et al. | 73/624 |
| 5,457,352 | A | 10/1995 | Muller et al. | |
| 5,955,823 | A * | 9/1999 | Nilsson et al. | 310/346 |

FOREIGN PATENT DOCUMENTS

| | | |
|---|---|---|
| DE | 3687271 T2 | 4/1993 |
| DE | 4230773 C1 | 2/1994 |
| DE | 295 09 574 U1 | 8/1996 |
| DE | 10084627 B4 | 7/2002 |
| DE | 102005044880 A1 | 4/2007 |
| DE | 102007010500 A1 | 9/2008 |
| WO | 00/72000 A1 | 11/2000 |
| WO | 2008/107246 A1 | 9/2008 |

OTHER PUBLICATIONS

EPO Search Report for EP Patent Appl. 11190371.2.
EPO Search Report for EP Patent Appl. 11190371.2, May 7, 2012, The Netherlands.
German Search Report corresponding to Application No. 10 2010 063 538.3 dated Sep. 28, 2011.

* cited by examiner

*Primary Examiner* — Mark Budd
(74) *Attorney, Agent, or Firm* — Bacon & Thomas, PLLC

(57) ABSTRACT

An ultrasonic transducer for an ultrasonic, flow measuring device comprising an electromechanical transducer element and an ultrasound window, wherein an adapting, or matching, layer liquid at operating conditions of the ultrasonic transducer is arranged between the electromechanical transducer element and the ultrasound window, wherein the ultrasonic transducer has holding means, which exert a releasable force toward the ultrasound window on the electromechanical transducer element, in order to hold the electromechanical transducer element in a predetermined position relative to the ultrasound window.

10 Claims, 1 Drawing Sheet

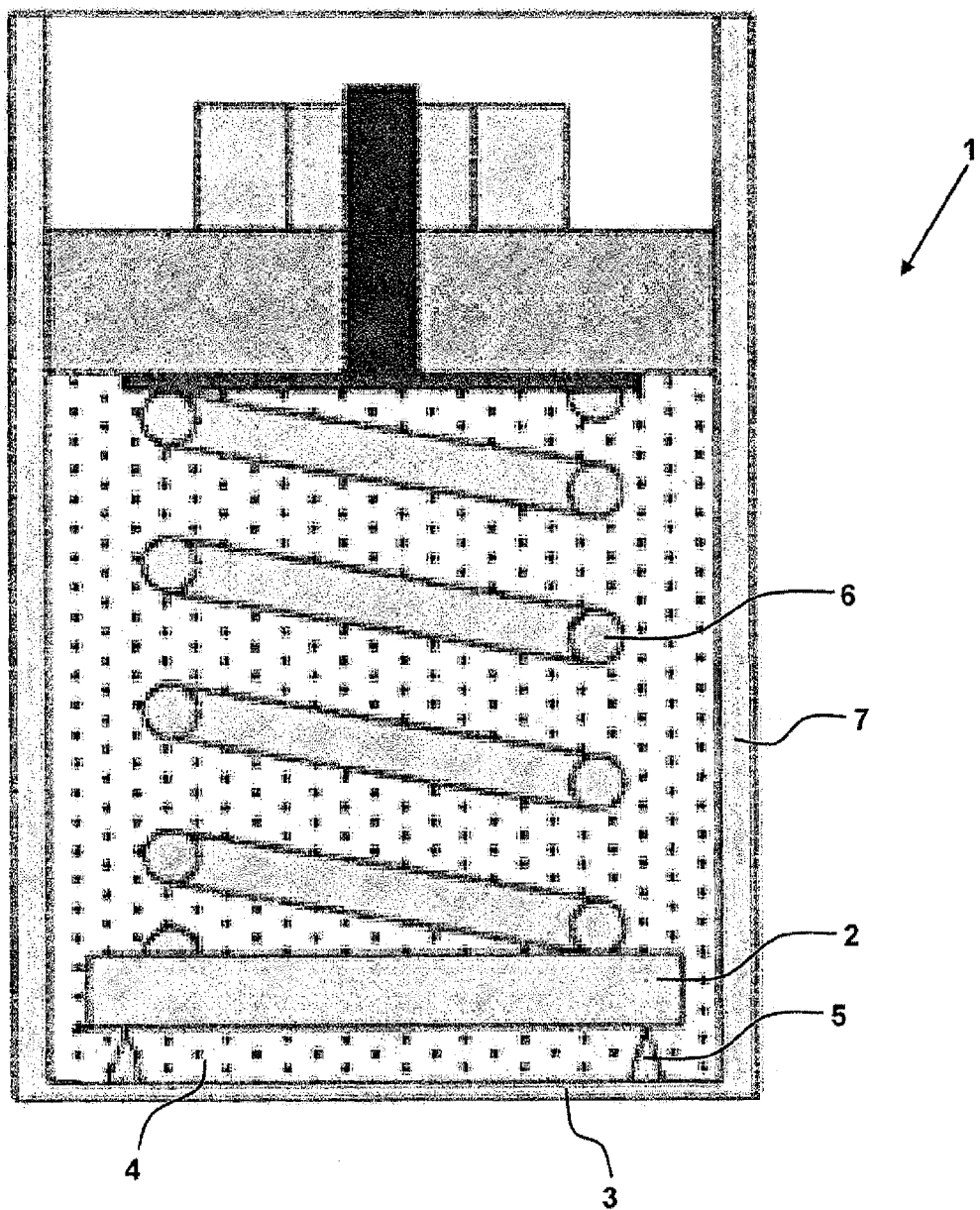

ULTRASONIC, FLOW MEASURING DEVICE

TECHNICAL FIELD

The present invention relates to an ultrasonic, flow measuring device, with an ultrasonic transducer, which has an ultrasound window.

BACKGROUND DISCUSSION

Ultrasonic, flow measuring devices are often applied in process- and automation technology. They permit in a simple manner, the determination of volume flow and/or mass flow in a pipeline. Known ultrasonic, flow measuring devices usually work according to the Doppler principle or the travel-time difference principle.

In the case of the travel-time difference principle, the different travel times of ultrasonic pulses are evaluated relative to the flow direction of the liquid. For this, ultrasonic pulses are transmitted at a certain angle to the tube axis both with as well as also counter to the flow. From the travel-time difference, the flow velocity, and therewith, in the case of known diameter of the pipeline section, the volume flow can be determined.

The ultrasonic waves are produced, and, respectively, received, with the assistance of ultrasonic transducers. Travel time is ascertained in U.S. Pat. No. 5,052,230 by means of short, ultrasonic pulses.

Normally, ultrasonic transducers are composed of an electromechanical transducer element, e.g. a piezoelectric element, and a membrane, or diaphragm. Ultrasonic waves are produced in the electromechanical transducer element and, in the case of clamp-on-systems, led via the membrane, or also coupling layer, to the tube wall and from there into the liquid. In the case of inline systems, the ultrasonic waves are coupled into the measured medium via the membrane. In such case, the membrane is also called an ultrasound window.

Between the piezoelectric element and coupling layer or ultrasound window, another layer can be arranged, a so called adapting, or matching, layer. The adapting, or matching, layer performs, in such case, the function of transmission of the ultrasonic signal and simultaneously the reduction of reflections caused by different acoustic impedances at interfaces between two materials.

Used as adapting, or matching, layer is an isotropic material, usually a resin or an adhesive, in order, supplementally to the transmission, to apply the electromechanical transducer element fixedly to the ultrasound window, as disclosed in DE 10 2008 055 123 B3. WO 2009/024403 A1 teaches, moreover, a technology, whereby the thickness of the adapting, or matching, layer can be predetermined.

DE 10 2007 042 663 A1 discloses that also an adapting, or matching, layer of oil is known; compare DE 295 09 574 U1. However, an adapting, or matching, layer both made of adhesive, as well as also one of oil, have unique disadvantages. Through different thermal expansions of ultrasound window, adhesive and electromechanical transducer element, frequently mechanical stresses are experienced in the named components, which can lead to inability of the ultrasonic transducer to function well. Oil tends, for example, to out-gas in the case of higher temperatures, or it loses its contact providing effect in the case of low temperatures.

SUMMARY OF THE INVENTION

An object of the invention is to provide an ultrasonic, flow measuring device, which combines high robustness with low cross-sensitivity, while being simultaneously simple to manufacture.

The object is achieved by an ultrasonic transducer which has an electromechanical transducer element and ultrasound window, a liquid adapting and matching layer and a holding device. The holding device which holds the electromechanical transducer element in a predetermined position relative to the ultrasound window.

BRIEF DESCRIPTION OF THE DRAWINGS

The invention permits numerous forms of embodiment. Some thereof will now be explained in greater detail based on the appended drawing, the sole FIGURE of which shows as follows:

FIG. 1 is an ultrasonic transducer of the invention in cross section.

DETAILED DISCUSSION IN CONJUNCTION WITH THE DRAWING

FIG. 1 shows an ultrasonic transducer 1 of the invention in cross section. It includes an electromechanical transducer element 2 for the conversion of mechanical waves, especially acoustic waves, into electrical signals and vice versa, and an ultrasound window 3, which serves for the in- and/or outcoupling of acoustic waves into and/or out from the ultrasonic transducer. It is suitable for application in an ultrasonic, flow measuring device of process technology, especially in a so-called inline, ultrasonic, flow measuring device. For travel-time difference measurement, such device includes at least two ultrasonic transducers of the invention 1, which are applied lying opposite one another in a measuring tube.

An ultrasonic transducer 1 of the invention is applied e.g. in the case of high temperature applications or the flow measurement of gas.

Besides the electromechanical transducer element 2 and the ultrasound window 3, the ultrasonic transducer 1 further includes, between the electromechanical transducer element 2, especially a piezoelectric ultrasonic transducer element, and the ultrasound window 3, an adapting, or matching, layer 4, which is liquid at the operating conditions of the ultrasonic transducer 1. The named components are here surrounded by a housing 7 of the ultrasonic transducer 1. Furthermore, the ultrasonic transducer 1 includes holding means, in this example of an embodiment, a spring 6, which exerts a simple to release force toward the ultrasound window 3 on the electromechanical transducer element 2, in order to hold the electromechanical transducer element 2 relative to the ultrasound window 3 in a region of a predetermined position.

Suitable as spring 6 is, for example, a helical- or Belleville spring, in order to apply the necessary force, which lies between 0.1 N and 100 N, for example, in the range between 5 N and 20 N. In such case, the force is a force in addition to the force of gravity acting on the electromechanical transducer element 2. The electromechanical transducer element 2 and the ultrasound window 3 are not bonded together—there are no adhesive forces acting, as e.g. from adhesives. But, the electromechanical transducer element 2 and the ultrasound window 3 are locked together due to the force of the spring. In case the electromechanical transducer element 2 and/or the ultrasound window 3 have, in given cases, congruent structures, which engage in one another, in order to achieve a yet better affixing of the named components to one another, then there is a shape interlocking, in addition to the force interlocking. Serving for electrical contacting of the electromechanical transducer element 2 is, for example, the holding means, here the spring 6.

The operating conditions of an ultrasonic transducer 1 of the invention depend on many factors. An important factor is, in such case, the temperature. The liquid, which functions as a liquid adapting, or matching, layer 4, is liquid at the operating conditions, i.e. between −100° C. and 200° C., especially between 0° C. and 100° C., especially at 20° C. The liquid of the adapting, or matching, layer 4 according to a form of embodiment of the invention is an oil, especially a mineral-, ester- or silicone oil. Since in liquids, as a rule, a transmission of acoustic transverse waves is not possible, these are here not transmitted by the electromechanical transducer element 2 to the ultrasound window 3 and vice versa. There results therefrom an improved signal form and an improved signal to noise ratio. Mechanical loadings or aging effects, as observed in the case of adhesives, are not to be expected. However, also the acoustic matching is provided by the selection of appropriate liquids, such as e.g. silicone oils with low acoustic impedances.

In order that the liquid adapting, or matching, layer 4 has a predetermined thickness between the electromechanical transducer element and the ultrasound window and therewith a predetermined height perpendicular to the electromechanical transducer element 2 and to the ultrasound window 3, according to a further development of the invention, space holder 5 are arranged between the electromechanical transducer element 2 and the ultrasound window 3. These establish the height between the electromechanical transducer element 2 and the ultrasound window 3. The electromechanical transducer element 2 and the ultrasound window 3 are especially arranged planparallel to one another. Space holders 5 are, in such case, for example, pins bonded with the ultrasound window. Ultrasound window 3 and spacers 5 could, however, also be produced monolithically as one piece.

The thickness of the liquid adapting, or matching, layer 4, and therewith in the further developed case the height of the spacers 5, and the thickness of the ultrasound window 3 are, in such case, so selected, that the liquid adapting, or matching, layer 4 and the ultrasound window 3 together effect a so-called $\lambda/4$ layer. The liquid adapting, or matching, layer 4 and the ultrasound window 3 are, indeed, different materials, the ultrasound window 3 being composed, for example, of stainless steel, and have therewith different velocities of sound and acoustic impedances different from one another. They can, however, in manner known to those skilled in the art, be calculated together, wherein a total impedance and a total sound velocity can be given. This can happen, since the thickness of the ultrasound window 3 is very small, especially less than $1/10$ the wavelength $\lambda$ of the acoustic signal emitted by the electromechanical transducer element 2 in the ultrasound window 3, for example, $1/100$ the wavelength $\lambda$ of the acoustic signal in the ultrasound window 3. The liquid adapting, or matching, layer 4 is then smaller than $1/4$ the wavelength $\lambda$ of the acoustic signal emitted by the electromechanical transducer element 2 in the adapting, or matching, layer 4, for example, $\lambda/8$. It is known to those skilled in the art that the thickness of a $\lambda/4$ layer can be an uneven number of times longer of $\lambda/4$. Therefore, it hold for the just named values of the thicknesses of the ultrasound window 3 and the adapting, or matching, layer 4 that these can correspondingly likewise be uneven numbered multiples of the named values. The so embodied $\lambda/4$ layer serves for matching the acoustic impedances between the electromechanical transducer element 2 and the measured medium. The measured medium has, for example, an acoustic impedance smaller than 1 MRayl, the electromechanical transducer element 2, however, larger than 5 or 10 MRayl. Then the $\lambda/4$ layer of the liquid adapting, or matching, layer and ultrasound window 3 has an impedance, which lies between these values. The liquid adapting, or matching, layer 4 has, for example, an acoustic impedance of about 0.5 to 1.5 MRayl.

There is thus a clear difference between a liquid adapting, or matching, layer 4 of the invention and a liquid serving as a coupling layer, where the concern is only better direct contact between electromechanical transducer element and ultrasound window, especially the equalizing of irregularities in their surfaces.

For simpler manufacturing and for better damping, or attenuation, the liquid of the adapting, or matching, layer 4 fills the total free inner space of a housing 7 of the ultrasonic transducer 1. In order to protect the housing against destruction from thermal expansion of the liquid, the pressure of the liquid in the housing 7 can be held to an upper limit or even approximately constant, for example, on ambient pressure or on 1 bar, by a movable and, thus, pressure equalizing piston 8, which closes the housing 7 on one end. Alternatively, other measures can be provided for pressure equalization in the housing. Thus, for example, a gas filled bellows or a closed pored, foam element could be placed in the housing 7 in the liquid, in order, in the case of rising pressure to deform and correspondingly limit the pressure. Since the acoustic properties of the liquid of the adapting, or matching, layer 4, however, scarcely change in the case of rising pressure, these measures are mechanical in nature.

The invention claimed is:

1. An ultrasonic transducer for an ultrasonic, flow measuring device comprising:
   an electromechanical transducer element;
   an ultrasound window;
   a liquid adapting, or matching, layer operating conditions of the ultrasonic transducer is arranged between said electromechanical transducer element and said ultrasound window; and
   said holding means, which exert a releasable force toward said ultrasound window on said electromechanical transducer element, in order to hold said electromechanical transducer element in a predetermined position relative to said ultrasound window.

2. The ultrasonic transducer for an ultrasonic, flow measuring device as claimed in claim 1, wherein:
   said holding means is a spring.

3. The ultrasonic transducer for an ultrasonic, flow measuring device as claimed in claim 1, wherein:
   said liquid adapting, or matching, layer has a predetermined height perpendicular to said electromechanical transducer element and to said ultrasound window.

4. The ultrasonic transducer for an ultrasonic, flow measuring device as claimed in claim 3, wherein:
   the height is predetermined by a space holder.

5. The ultrasonic transducer for an ultrasonic, flow measuring device as claimed in claim 1, wherein:
   the liquid of the adapting, or matching, layer fills a total free inner space of a housing of said ultrasonic transducer.

6. The ultrasonic transducer for an ultrasonic, flow measuring device as claimed in claim 1, wherein:
   the liquid of the adapting, or matching, layer is a mineral-, ester- or silicone oil.

7. The ultrasonic transducer for an ultrasonic, flow measuring device as claimed in claim 1, wherein:
   said holding means is so embodied that it serves for electrical contacting of said electromechanical transducer element.

8. The ultrasonic transducer for an ultrasonic, flow measuring device as claimed in claim 1, wherein:

said liquid adapting, or matching, layer and said ultrasound window have together an acoustic impedance, which is smaller than the acoustic impedance of said electromechanical transducer element.

9. The ultrasonic, flow measuring device, characterized in that it has at least two ultrasonic transducer; as claimed in claim 1, wherein:

said at least two ultrasonic transducers are applied lying opposite one another in a measuring tube.

10. The use of an ultrasonic transducer as claimed in claim 1, for measuring gaseous measured media or for measuring at high temperatures.

* * * * *